United States Patent
McLean et al.

(10) Patent No.: US 7,067,217 B2
(45) Date of Patent: Jun. 27, 2006

(54) COMPACT FUEL CELL LAYER

(75) Inventors: Gerard Francis McLean, West Vancouver (CA); Duhane Lam, Vancouver (CA); Olen Vanderleeden, Coquitlam (CA)

(73) Assignee: Angstrom Power, North Vancouver (CA)

( * ) Notice: Subject to any disclaimer, the term of this patent is extended or adjusted under 35 U.S.C. 154(b) by 0 days.

(21) Appl. No.: 10/818,611

(22) Filed: Apr. 6, 2004

(65) Prior Publication Data

US 2005/0221155 A1 Oct. 6, 2005

(51) Int. Cl.
*H01M 2/14* (2006.01)
(52) U.S. Cl. .......................................... 429/38; 429/39
(58) Field of Classification Search ................ 429/38, 429/39
See application file for complete search history.

(56) References Cited

U.S. PATENT DOCUMENTS

| | | | |
|---|---|---|---|
| 3,634,140 A * | 1/1972 | Von Krusenstierna | 429/25 |
| 5,252,410 A | 10/1993 | Wilkinson | 429/33 |
| 5,364,711 A * | 11/1994 | Yamada et al. | 429/15 |
| 5,480,738 A | 1/1996 | Elangovan | 429/32 |
| 5,508,128 A * | 4/1996 | Akagi | 429/30 |
| 5,631,099 A | 5/1997 | Hockaday | 429/30 |
| 5,672,439 A | 9/1997 | Wilkinson | 429/40 |
| 5,759,712 A | 6/1998 | Hockaday | 429/30 |
| 5,861,221 A | 1/1999 | Ledjeff | 429/32 |
| 5,925,477 A | 7/1999 | Ledjeff | 429/32 |
| 5,989,741 A | 11/1999 | Bloomfield | 429/32 |
| 6,060,188 A | 5/2000 | Muthuswamy | 429/31 |
| 6,127,058 A | 10/2000 | Pratt | 429/30 |
| 6,387,557 B1 * | 5/2002 | Krasij et al. | 429/32 |
| 6,620,542 B1 | 9/2003 | Pan | 429/41 |
| 6,740,444 B1 | 5/2004 | Leban | 429/41 |
| 6,830,736 B1 | 12/2004 | Lamla et al. | 422/211 |

FOREIGN PATENT DOCUMENTS

| | | |
|---|---|---|
| CA | 2 273 316 | 11/1999 |
| CA | 2 396 191 | 9/2001 |
| CA | 2 438 733 | 8/2002 |
| CA | 2 484 294 | 11/2003 |
| EP | 0585049 | 8/1993 |
| EP | 0 823 743 | 7/1997 |

(Continued)

OTHER PUBLICATIONS

Wainwright, et al. "A Microfabricated Hydrogen/Air Fuel Cell" 195 Meeting of the Electrochemical Society, Seattle, WA ,1999.

*Primary Examiner*—Patrick Joseph Ryan
*Assistant Examiner*—Julian Mercado
(74) *Attorney, Agent, or Firm*—Buskop Law Group, P.C.; Wendy Buskop

(57) ABSTRACT

The fuel cell layer with a central axis includes a first and a second unit fuel cell, an oxidant plenum comprising an oxidant; and a fuel plenum comprises a fuel; and each unit fuel cell comprises: a first and second process layer; a first cavity and second cavity formed between the first and second process layer and a first process layer of an adjacent unit fuel cell; a first perimeter barrier disposed on the second process layer substantially surrounding the second cavity; a second perimeter barrier disposed on the first process layer substantially surrounding the first cavity forming a unit fuel cell comprising a front face and back face; the first cavity is in communication with the oxidant plenum; the second cavity is in communication with the fuel plenum; wherein at least one of the process layers transports ions between the first and second cavities.

59 Claims, 9 Drawing Sheets

FOREIGN PATENT DOCUMENTS

| | | |
|---|---|---|
| EP | 0823743 | 8/1997 |
| GB | 2339058 | 1/2000 |
| JP | 8050903 | 2/1996 |
| WO | PCT/US01/11763 | 12/2001 |
| WO | PCT/US02/00063 | 1/2002 |
| WO | PCT/US02/17434 | 6/2002 |

* cited by examiner

COMPACT FUEL CELL LAYER

FIELD

The present embodiments relate to a compact fuel cell of one or more unit fuel cells, wherein each unit fuel cell has two or more process layers.

BACKGROUND

Existing fuel cells generally are a stacked assembly of individual fuel cells, with each stack producing high current at low voltage. The typical reactor construction involves reactant distribution and current collection devices brought into contact with a layered electrochemical assembly consisting of a gas diffusion layer, a first catalyst layer. With the exception of high temperature fuel cells, such as molten carbonate cells, most proton exchange membrane, direct methanol, solid oxide or alkaline fuel cells have a layered planar structure where the layers are first formed as distinct components and then assembled into a functional fuel cell stack by placing the layers in contact with each other.

One major problem with the layered planar structure fuel cell has been that the layers must be held in intimate electrical contact with each other, which if intimate contact does not occur the internal resistance of the stack increases, which decreases the overall efficiency of the fuel cell.

A second problem with the layered planar structured fuel cell has been that with larger surface areas, problems occur to maintain consistent contact with both cooling and water removal in the inner recesses of the layered planar structured fuel cell. Also if the overall area of the cell becomes too large then there are difficulties creating the contacting forces needed to maintain the correct fluid flow distribution of reactant gases over the electrolyte surface.

Since both reactants are required to flow within the plane of the layered planar chemical reactor, at least four and up to six distinct layers have been required to form a workable cell. These layers are usually manufactured into two separate chemical reactors components. A chemical reactor stack is, then, formed by bringing layers into contact with each other. In forming the chemical reactor stack by contacting the layers, gas diffusion must be allowed within the layers to prevent gas from leaking from the assembled chemical reactor stack. The assembled stack usually has to be clamped together with significant force in order to activate perimeter seals and reduce internal contact resistance. Compressing layers together using brute force is inefficient and expensive.

Electrical energy created in the fuel cell has to travel between layers of material compressed together before it can be used. These layers include membrane electrode assemblies, gas diffusion layers, separator plates etc. The resistance to the transfer of electrical energy through each layer and between layers also affects the performance of the fuel cell. The contact pressure and contact area that can be achieved between the layers of the fuel cell stack is directly proportional to the conductivity of these components and hence the performance of the fuel cell stacks.

Laying out layers of material and compressing them together using the brute force approach of traditional fuel cell stacks is inefficient and expensive. In addition, such designs suffer from long term performance degradation because of thermal and mechanical cycles that occur during the operation of the fuel cells.

In manufacturing fuel cell stack assemblies using this typical layering approach of all the components, accurately aligning the layers is difficult. Inaccurate alignment has a detrimental effect on the performance and durability of the fuel cell stacks.

A need has existed for micro, or small fuel cells having high volumetric power density. A need has existed for micro fuel cells capable of low cost manufacturing because of having fewer parts than the layered planar structure fuel cell. A need has existed for micro fuel cells having the ability to utilize a wide variety of electrolytes. A need has existed for a micro fuel cell, which has substantially reduced contact resistance within the fuel cell. A need has existed for a micro fuel cell, which has the ability to scale to high power density fuel cells. A need has existed for a micro fuel cell having an increased reactant surface area. A need has existed for a fuel cell capable of being scaled to micro-dimensions. A need has existed for fuel cells capable of being connected together without the need for external components for connecting the fuel cells together.

A need has existed for a compact fuel cell with high aspect ratio cavities. The aspect ratio of the fuel cell is defined as the ratio of the fuel cell cavity height to the width. Increasing this ratio is beneficial for increasing the efficiency of the fuel cell.

A need has existed to develop fuel cells topologies or fuel cell architectures that allow increased active areas to be included in the same volume, i.e. higher density of active areas. The present embodiments meet these needs.

SUMMARY

The fuel cell layer with a central axis includes one or more unit fuel cells, a front fuel plenum, and a back oxidant plenum. At least a first unit fuel cell and a second unit fuel cell are disposed adjacent to each other to form a front side and a back side of the fuel cell. The front fuel plenum communicates with the front side and a back oxidant plenum communicates with the back side.

Each unit fuel cell is made of a front and back process layer, a front and back cavity, and a front and back perimeter barrier. The resulting assemblage is configured so the front cavity is in communication with the front side of the fuel cell, and the back cavity is in communication with the back side of the fuel cell. The process layers facilitate an exchange of fuel and oxidants between the plenums.

BRIEF DESCRIPTION OF THE DRAWINGS

In the detailed description of the preferred embodiments presented below, reference is made to the accompanying drawings, in which.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular descriptions and that it can be practiced or carried out in various ways.

The benefits of the fuel cell layer include increased reactant surface areas as compared to other fuel cell layers. The fuel cell layer also provides an ability to scale to micro-dimensions, so that very small fuel cells can be created.

The fuel cell layer was designed to enable users to scale up the fuel cell layer to larger sizes without the need for external components to hold the fuel cell layer together.

Overall, the fuel cell layer with a central axis has a first and second unit fuel cell that are disposed adjacent to each other; an oxidant plenum comprising an oxidant; and a fuel plenum comprising a fuel.

Each unit fuel cell comprises a first and second process layer, with a first cavity formed between the first and second process layers, a second cavity formed between the second process layer and the first process layer of an adjacent unit fuel cell. The unit fuel cell also consists of a first perimeter barrier disposed on the second process layer substantially surrounding the second cavity and a second perimeter barrier disposed on the first process layer substantially surrounding the first cavity forming a unit fuel cell. This unit fuel cell comprises a front face and a back face, and the first cavity is in communication with the oxidant plenum and the second cavity is in communication with the fuel plenum, and at least one of the process layers transports ions between the first and second cavities.

Figure 1:
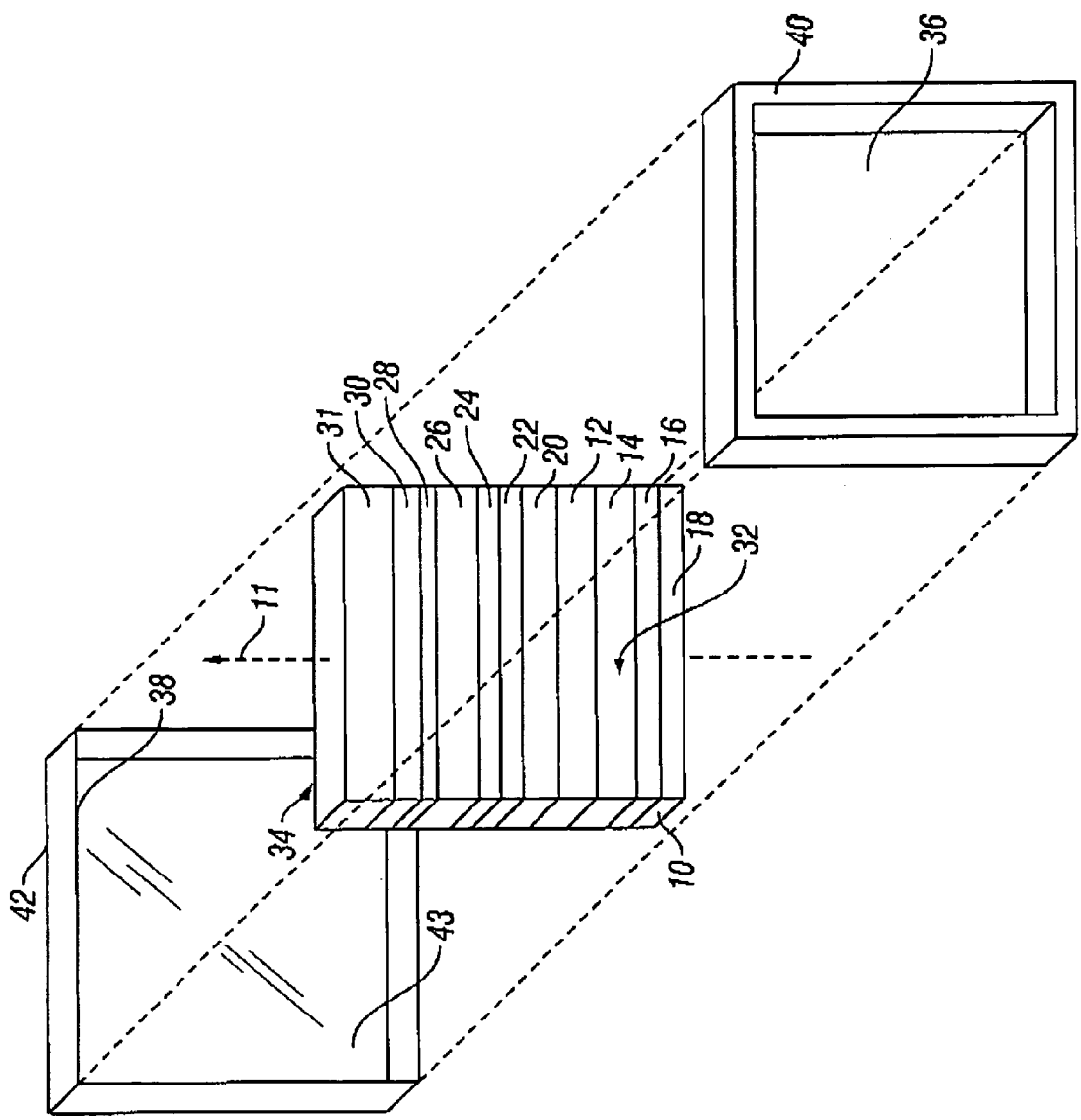
FIG. 1 depicts a front perspective view of a thin flat construction of a fuel cell layer.
Figure 2:
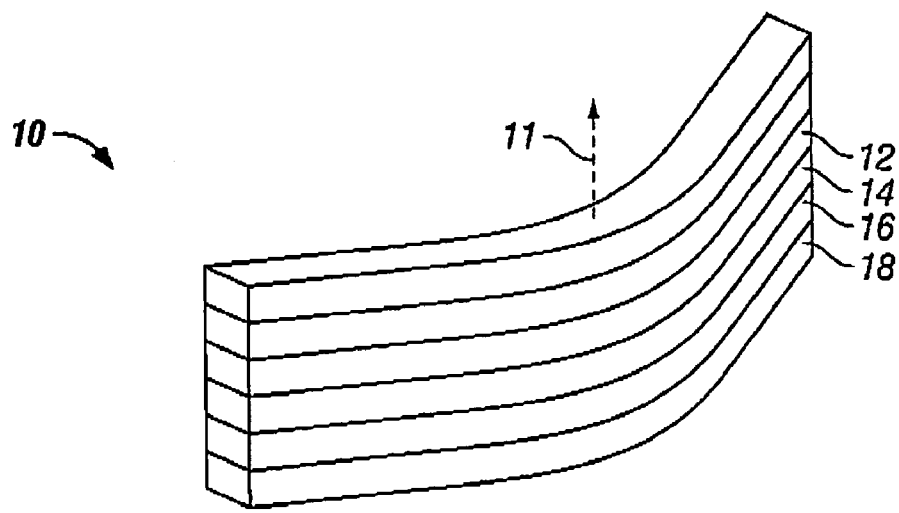
FIG. 2 depicts a front perspective view of a curvilinear construction of a fuel cell layer.

With reference to the figures, FIG. 1 is a front perspective view of a fuel cell layer. FIG. 1 depicts a thin flat construction embodiment of the fuel cell layer. FIG. 2 depicts a thin curvilinear embodiment of the fuel cell layer (10). Throughout the figures, the fuel cell layer (10) is depicted having a central axis (11).

FIG. 1 shows a thin flat fuel cell layer with eleven unit fuel cells. The eleven unit fuel cell layer preferably has an overall dimension that is between about 1 centimeter and about 100 centimeters in length, between about 1 millimeter and about 50 centimeters in width, and a thickness of between about 100 nanometers and about 5 centimeters.

FIG. 2 depicts a cylindrical version of a fuel cell layer with at least 10 unit fuel cells. The fuel cell depicted in FIG. 2 has an overall diameter between 1 centimeter and 5 centimeters and a height of between 5 millimeters and 80 millimeters.

As an alternative to embodiments depicted in FIG. 1 and FIG. 2, the fuel cell layer (10) can be embodied in other shapes, such as a prismatic shape, a boxlike shape or an irregular three dimensional shape. The fuel cell layer (10) can be in any of the shape embodiments and can have a variable thickness. By variable thickness, that is, it can be more narrow at one end and larger at the other end. Variable thickness can also mean that one individual unit fuel cell can be thicker than an adjacent unit fuel cell.

FIG. 1 depicts an embodiment of the fuel cell layer (10) composed of a first unit fuel cell (12), a second unit fuel cell (14) and nine other unit fuel cells (16, 18, 20, 22, 24, 26, 28, 30, and 31).

The first and second unit fuel cells are disposed adjacent each other and form a front side (32) and a back side (34). The front side communicates with be the oxidant plenum, and the back side communicates with fuel plenum.

The fuel cell layer (10) includes an oxidant plenum (36) and a fuel plenum (38). The oxidant plenum (36) is enclosed by a structure (40). The oxidant plenum (36) can contain air, oxygen, mixtures of inert gas and oxygen, and combinations thereof. The structure (40) can either be a closed container or open to ambient atmosphere. FIG. 1 depicts an embodiment of the structure (40) open to ambient atmosphere. When the structure is open to the ambient atmosphere, the structure is an optional component. The structure (40), when open to the atmosphere, adds structural support to the oxidant plenum (36).

The fuel plenum (38) is enclosed by a device (42). The fuel plenum (38) can contain fuel such as hydrogen, hydrogen from reformate, methanol, ethanol, formic acid, ammonia, combinations of these, and other similar fuels. The device (42) can be a closed container or open to ambient atmosphere. FIG. 1 depicts an embodiment wherein the device (42) is a closed container with a solid back wall (43).

The fuel cell layer (10) is constructed of two or more unit fuel cells. The design of the fuel cell layer (10) can utilize from 2 unit cells to 50,000 or more unit fuel cells to be adjoined to create the fuel cell layer. Preferably, between 2 unit fuel cells and 500 unit fuel cells are used in the fuel cell with another embodiment of between 2 unit fuel cells and 100 unit fuel cells.

The unit fuel cells can be oriented to enclose the fuel plenum (38). The unit fuel cells can conform to the shape of the fuel plenum (38). In this way, the plenum can be formed by the unit fuel cells themselves In FIG. 3, the unit fuel cells are disposed roughly parallel to each other and then the parallel unit fuel cells are disposed horizontally around the central axis (11).

Figure 4:
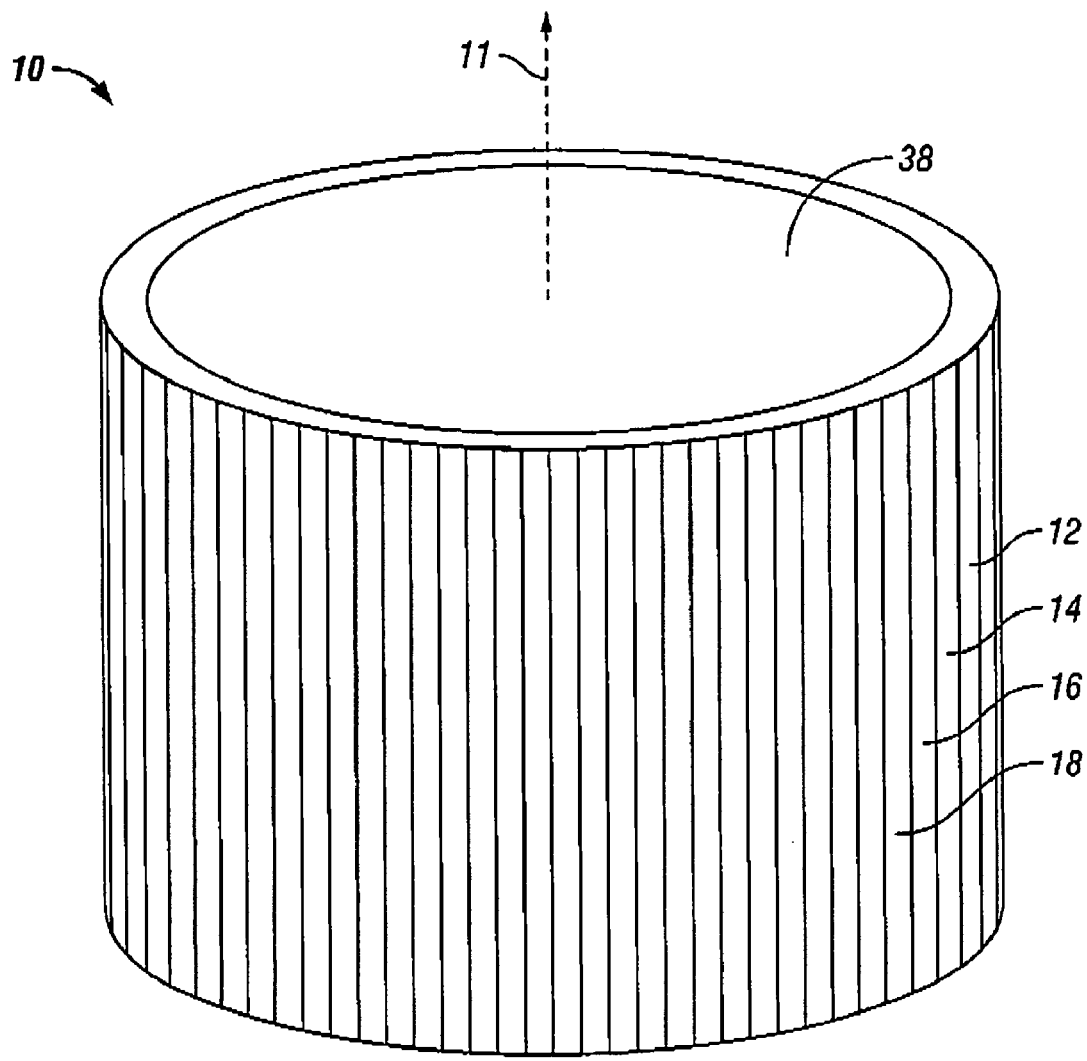
FIG. 4 depicts a front perspective view of a fuel cell layer, wherein the unit fuel cells enclosing the fuel plenum are vertically oriented.

FIG. 4 depicts an embodiment wherein the unit fuel cells that enclose the back reactant plenum are disposed roughly parallel to each other and then the unit fuel cells are disposed parallel to the central axis.

Figure 5:
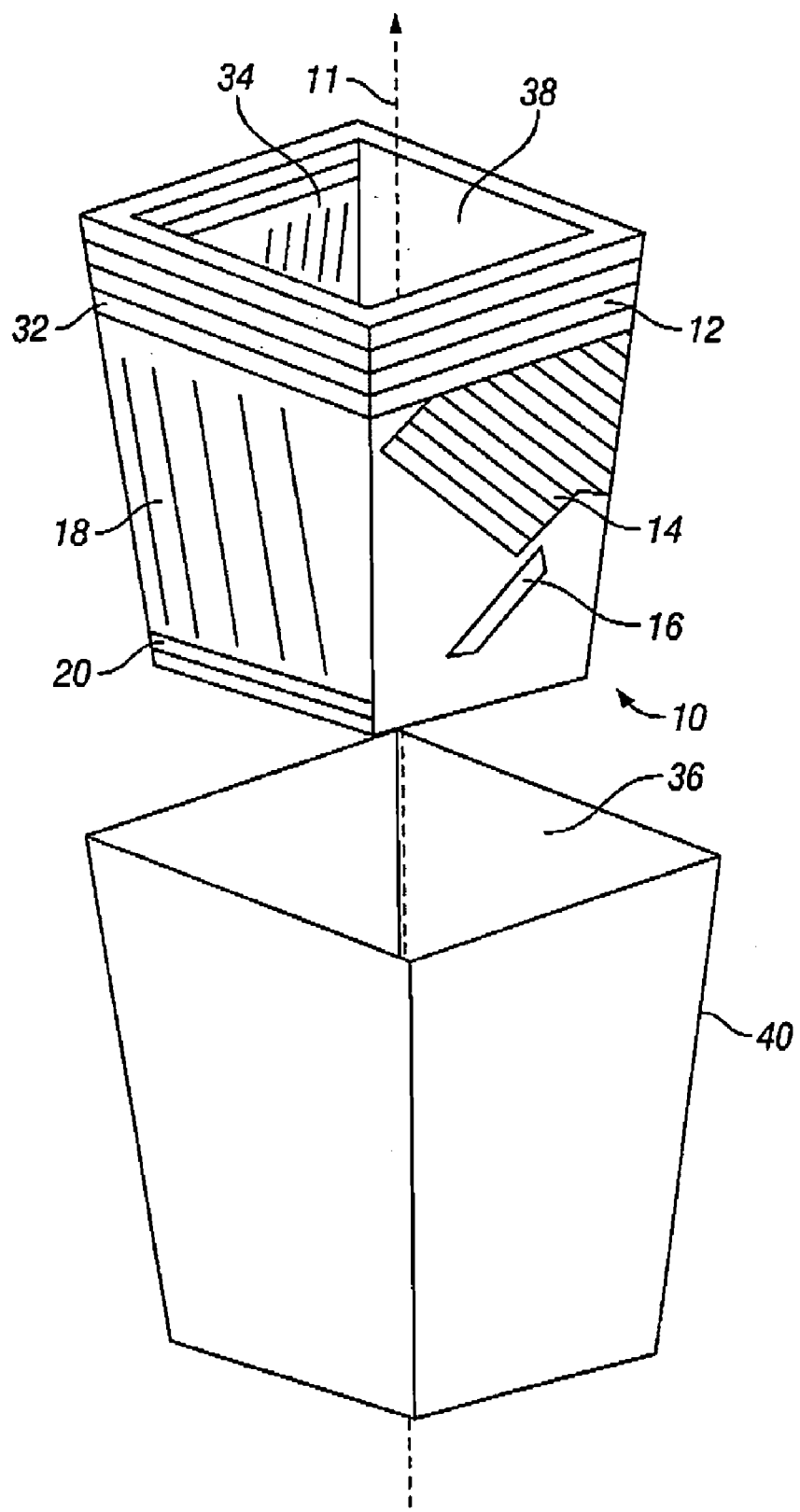
FIG. 5 depicts an exploded perspective view of a fuel cell layer, wherein the unit fuel cells are disposed in parallel at an arbitrary angle to the central axis of a fuel cell layer.

FIG. 5 depicts an embodiment wherein the unit fuel cells are disposed roughly parallel to each other but at an arbitrary angle to the central axis of the fuel cell layer. Also seen in FIG. 5, the unit fuel cells can be disposed in groups and then each group can be disposed at an arbitrary angle to adjacent groups.

Figure 6:
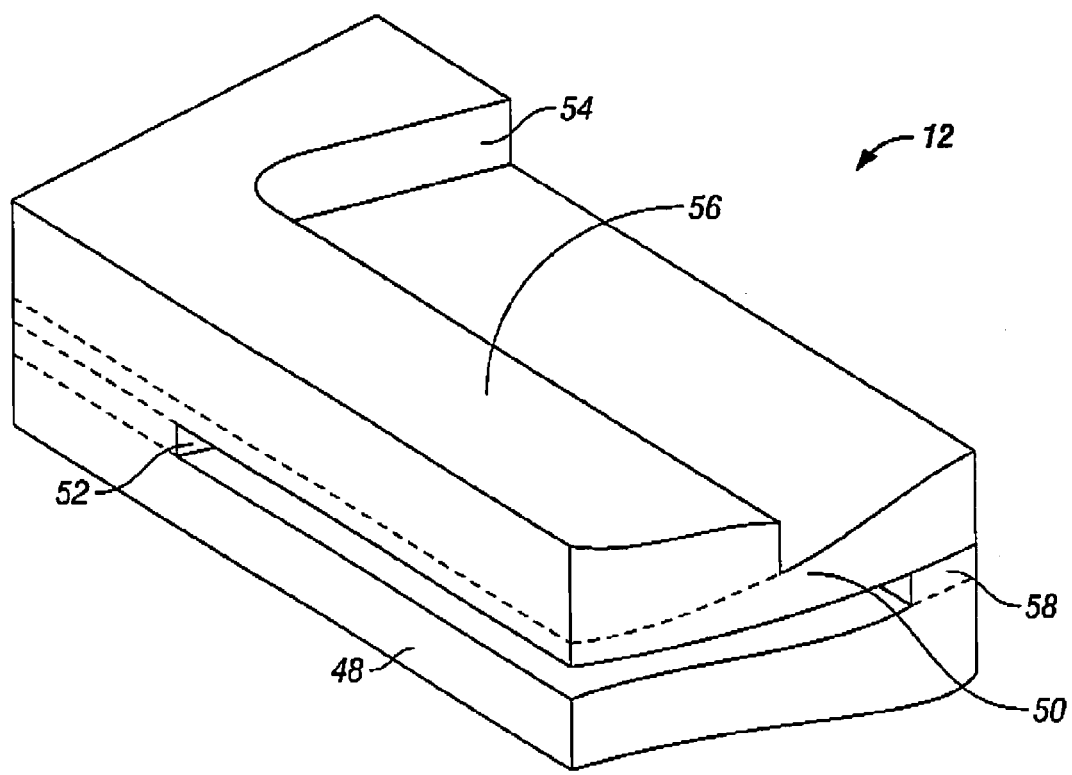
FIG. 6 depicts a cutaway perspective view of a unit fuel cell.

FIG. 6 depicts a cutaway perspective view of an individual unit fuel cell (12). The unit fuel cell (12) comprises a first process layer (48) and a second process layer (50). The process layers are depicted as thin sheets with each process layer having, preferably, a thickness between about 1 nanometer to about 2 centimeters. The first and second perimeter barriers can comprise widths which can vary from being narrower on one portion of the perimeter barrier to wider on another portion of the perimeter barrier as shown in the by the process layers (48) and (50). As an alternative, the process layers can have a thickness different from each other. A process layer can be formed from two or more thin layers that are placed in contact with each other.

At least one process layer must be an ionically conductive process layer in order to facilitate the transport of ions. Optionally, at least one process layer may be made electronically conductive to transport electrons between unit fuel cells.

An ionically conductive process layer can be made from a proton exchange membrane, an electrolyte filled microporous structure, a liquid electrolyte trapped in a mesh, and combinations thereof.

An electronically conductive process layer can be made from an electrical conductor, a filled metal composite, a filled micro-structure of polymer, filled epoxy composite, graphite composite, or combinations thereof.

In both cases, whether the process layer is ion or electron conducting, the process layers should form substantially a gas barrier preventing the flow of fuel or oxidant through the process layers.

The process layers can be made from a variety of materials. For example, the process layer material could be an electrolyte, an ion exchange membrane, a catalyst, an electrical conductor, and combinations of these. For example, a workable ion exchange membrane would be Nafion™ available from E.I. DuPont DeNamours of Wilmington, Del.

Electrical conductors contemplated for use in the compact chemical reactor is a thin film of metal, such as stainless steel, aluminum, tin, copper or a silver filled epoxy, such as model number TF12202 from Tech Film of Peabody, Mass.

Alternatively, each process layer can be made of a filled metal composite, a filled microstructure of polymer, a filled porous polymer composite, filled epoxy composite, graphite composite, or combinations of these materials. Filled metal composites can be a stainless steel filled with carbon, such as those available from Angstrom Power Inc. of Vancouver, Canada. Filled microstructures of polymers include Primea™ membrane available from Gore Industries of Elkton, Md. Filled epoxy composites include those available from Tech Film of Peabody, Mass. Graphite composites include Grafoil™ available from Graftech of Wilmington, Del.

Continuing with FIG. 6, each individual unit fuel cell has a first cavity (52) and a second cavity (54). The first cavity (52) is formed between the first and second process layers (48 and 50). The second cavity (54) is formed when two unit fuel cells are arranged adjacent each other. The second cavity (54) is formed between the second process layer (50) of one unit fuel cell and the first process layer (48) of an adjacent unit fuel cell. Each individual unit fuel cell includes a front perimeter barrier (56) and a back perimeter barrier (58). The front perimeter barrier (56) is located on the first process layer (50) substantially surrounding the second cavity (54). The front perimeter barrier (56) can optionally completely enclose the second cavity (54).

Likewise, the back perimeter barrier (58) can be located on the second process layer (48) substantially surrounding the first cavity (52). The back perimeter barrier (58) can optionally completely enclose the first cavity (52).

The unit fuel cells can be oriented so that the first perimeter barrier of each unit fuel cell connects to the first process layer of each unit fuel cell.

The formed first and second cavities (52 and 54) allow the reactants to move from the fuel and oxidant plenums to the process layers so that fuel oxidation and oxidant reduction can occur to sustain the fuel cell. In a preferred embodiment the only transport mechanism for the movement of reactants within the cavities is by diffusion. In an alternative embodiment, the diffusion can be aided by other transport mechanisms including convection and forced flow. The cavities can be filled with material or structured to aid in the distribution of reactants to the process layers.

One or more of the cavities can be filled partially or completely with a material to aid in the transport of reactant, or transport of by-products of the reaction caused by the reactants. A porous media, such as those available from Angstrom Power Inc. of Vancouver, Canada can be used to partially or completely fill the cavities. In a preferred embodiment, the cavity is filled 100% with the porous media although the cavity can be filled as little as 5% with the porous media.

The fuel cell layer provides high surface area process layers which are in communication with the reactant plenums through the first or second cavities. The first or second cavities have high aspect ratios, wherein the distance from the front or back face to the opposite side of the cavity is much larger than the height of the first or second perimeter barrier.

The formed cavities have a high aspect ratio wherein the depth of the cavity is much larger than its height. The aspect ratio may be greater than 1 cm/cm and can be as much as 100 cm/cm and is preferably between 2.5 cm/cm and 15 cm/cm The selection of the aspect ratios of the cavities must be carefully chosen to accommodate the properties of the porous media which has been utilized in the cavities. For example when the transport of fuel and oxidant from the plenums to the gas diffusion electrode formed in the cavities is primarily by diffusion the aspect ratio must be maintained so that the concentration of reactants is sufficiently large to sustain the reactions throughout the electrode.

The perimeter barriers ensure that reactant from one reactant plenum does not migrate into another reactant plenum.

The perimeter barriers keep the reactant from migrating by either the material itself or the form of the perimeter barrier, or both form and material. Usable materials for the perimeter barriers can include metals, such as stainless steel; silicone, such as RTV™ available from Dow Coming of Midland, Mich.; rubber, such as those available from the Apple Rubber of Lancaster, N.Y.; polyamide, such as nylon available from DuPont of Wilmington, Del.; synthetic rubber, such as BUNA available from Dow Synthetic Rubber of Edegem Belgium; epoxy, such as those available from EPO Tech of Billerica, Mass.; polytetrafluoroethylene, also available as Teflon™; polyvinyldiflouride, known as Kynar™, available from Atofina Chemicals, Incorporated of Philadelphia, Pa.; or composites thereof, laminates thereof, alloys thereof, and/or blends of these materials.

The unit fuel cells can be oriented so that the first perimeter barrier of each unit fuel cell connects to the first process layer of the adjacent unit fuel cell.

Shown in FIG. 6, the first cavity (52) communicates with the oxidant plenum. The second cavity (54) communicates with the fuel plenum. One or more of the process layers facilitate the transport of ions between the oxidant and fuel plenums.

Figure 7:
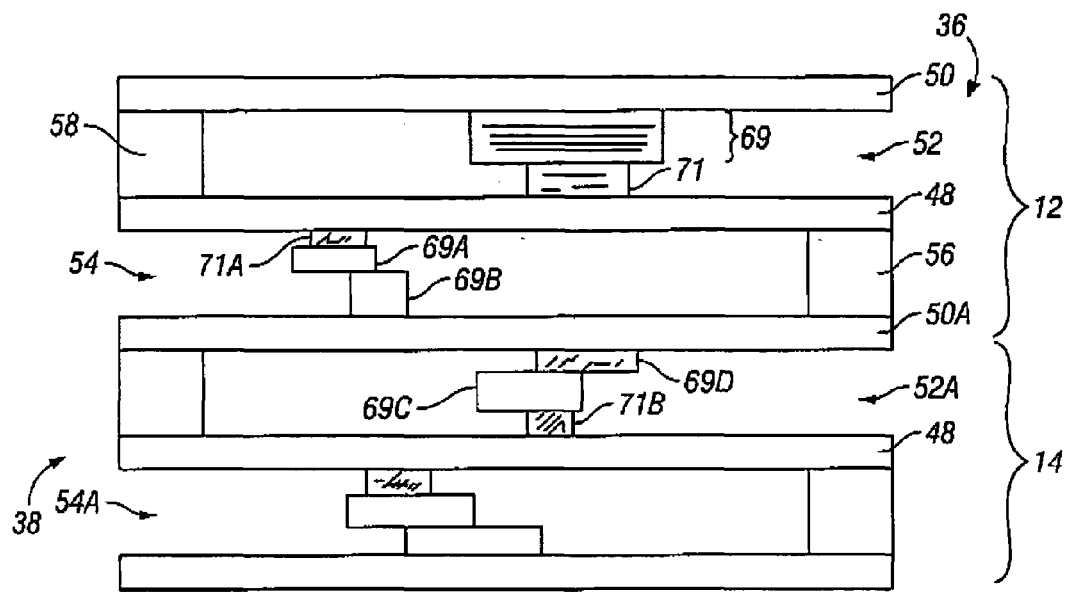
FIG. 7 depicts a cross sectional schematic of portion of a bipolar fuel cell layer showing two unit fuel cells connected in a bipolar manner.

FIG. 7 depicts a cross sectional schematic of a bipolar fuel cell layer showing two unit fuel cells (12 and 14) connected in a bipolar manner. When forming a bipolar fuel cell layer, each unit fuel cell comprises one process layer that is ionically conductive (48) and one process layer that is electronically conductive (50a).

In a bipolar configuration, the porous conductive layer (69) electrically connects the catalyst layer (71) to the electronically conductive process layers (50). The catalyst layers (71, 71a and 71b) connect directly to the ionically conductive process layer (48). The porous layer can be made of at least two differing porous materials (69a, 69b, 69c and 69d), which electrically connects to the catalyst layer (71a and 71b) to the electronically conductive process layer (50a) enabling current to flow between electrodes of adjacent unit fuel cells.

Figure 8:
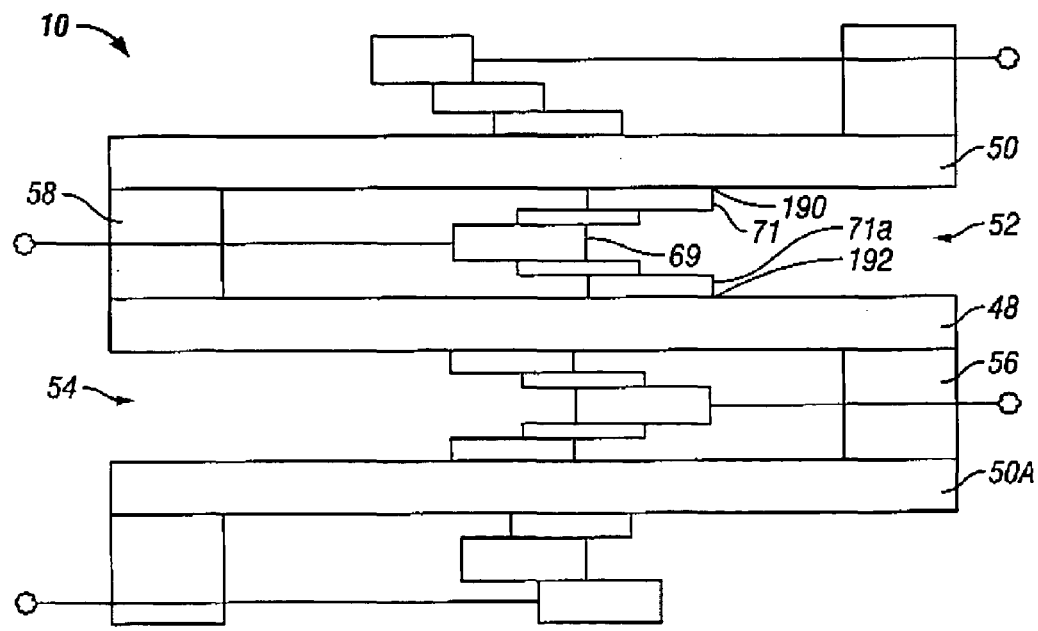
FIG. 8 depicts a cross sectional schematic of a uni-polar fuel cell layer showing two unit fuel cells connected in an edge collected manner.

FIG. 7 and FIG. 8 depict cavities where one or more of the cavities can also be filled or partially filled with one or more gas diffusion electrodes. The gas diffusion electrodes can be formed using one or more porous layers (69), and one or more catalyst layers (71). The catalyst layers adjoin the process layers forming anodes or cathodes, depending on the reactant presented to the interface. The first cavity or the second cavity can be at least partially filled with a catalyst to promote the function of the reactor.

FIG. 8 depicts a cross sectional schematic of an alternate embodiment of the fuel cell layers showing two unit fuel cells (12 and 14) connected in an edge collected manner. In this embodiment, both of the process layers of the unit fuel cells are ionically conducting process layers. In an alternative embodiment, the catalyst layers (71 and 71a) adjoin the process layers (48 and 50) to form two identical polarity electrodes (190 and 192). The current flowing into or out of the identical polarity electrodes (190 and 192) passes through at least one porous conductive layer (69). The flow of current through the porous conductive layer creates an edge collected uni-polar fuel cell layer (10).

The catalyst layer of either the bipolar or edge collected fuel cell layer configuration can be composed of a noble metal catalyst, a transition metal catalyst, alloys thereof and combinations thereof. The catalyst layer can be a carbon supported catalyst or a thin film catalyst formed by spraying, sputtering, electroplating, printing, pulsed laser deposition, or combinations thereof. Alternatively, the catalyst layer can be cracked.

Each individual unit fuel cell includes a first perimeter barrier (56) and a second perimeter barrier (58). The first perimeter barrier (56) is located on the second process layer (50) substantially surrounding the second cavity (54). The first perimeter barrier (56) can completely enclose the second cavity (54).

Likewise, the second perimeter barrier (58) is located on the first process layer (48) substantially surrounding the first cavity (52). The second perimeter barrier (58) can completely enclose the first cavity (52).

Figure 9:
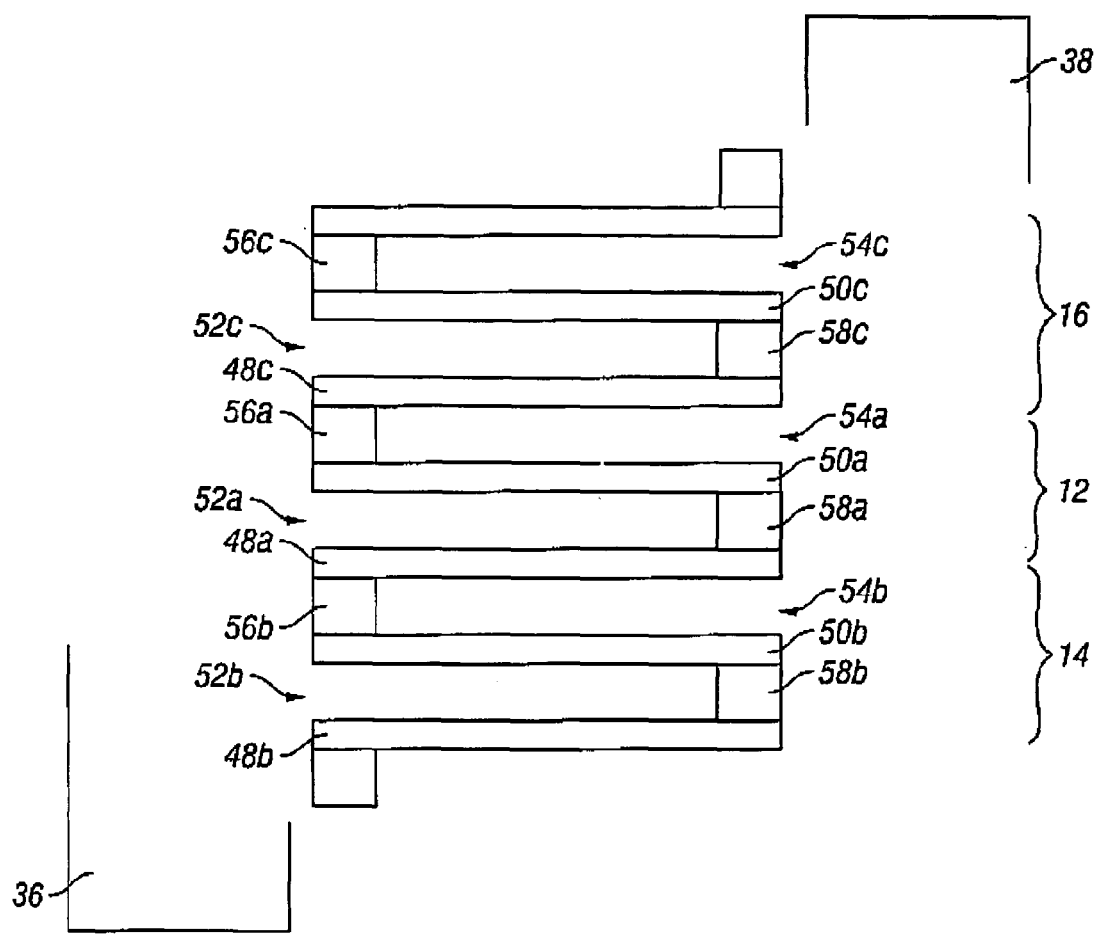
FIG. 9 depicts a cross-sectional schematic of a group of unit fuel cells stacked sequentially.

FIG. 9 depicts a cross-sectional schematic of a group of unit fuel cells (12, 14, and 16) stacked sequentially. Each unit fuel cell has a first process layer (48a, 48b, and 48c) and a second process layer (50a, 50b, and 50c). The first cavity (52a, 52b, and 52c) is formed between the corresponding first and second process layers. Likewise, the second cavity (54a, 54b, and 54c) is formed by corresponding first and second process layers.

A typical fuel cell layer has an overall length between 1 millimeter and 100 centimeters; an overall width of between 1 millimeter and 50 centimeters; and an overall thickness between the front face and the back face of the fuel cell between 100 nanometers and 5 centimeters.

Figure 10:
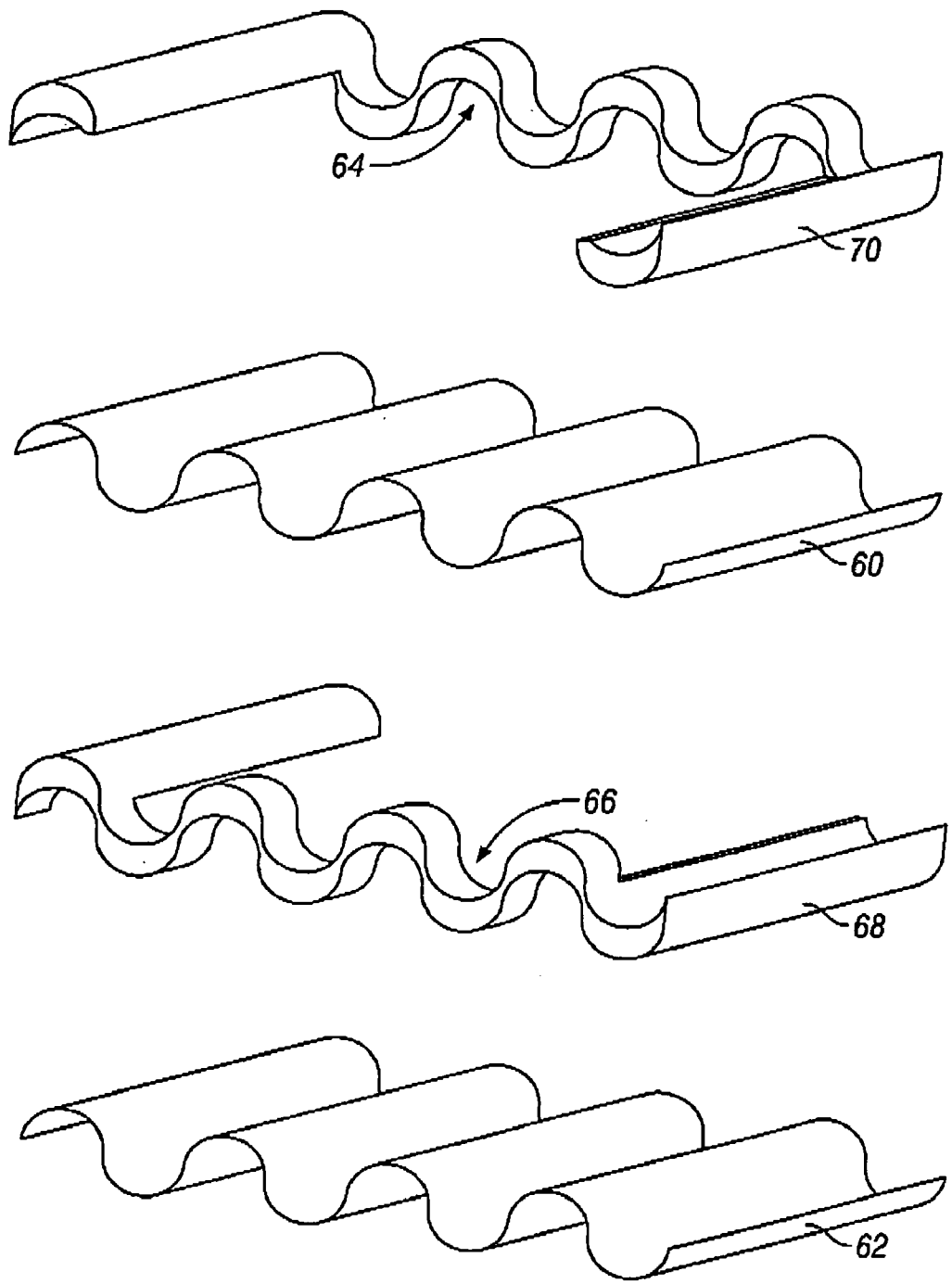
FIG. 10 depicts an exploded perspective view of an undulating unit fuel cell.

FIG. 10 depicts an exploded perspective view of an undulating unit fuel cell. The process layers are undulating first and second process layers (60 and 62). The first cavity is an undulating first cavity (64) and the second cavity is an undulating second cavity (66), the first perimeter barrier is an undulating first perimeter barrier (68), and the second perimeter barrier is an undulating second perimeter barrier (70). Undulating in the context of this application refers to non-planar process layers, such as layers which are sinusoidal in shape, or arcs, or irregular in some other manner. It is contemplated that some of the process layers can be undulating while remaining process layers can be planar and still form a usable fuel cell layer. Likewise, the first cavity is an undulating first cavity (64), the second cavity is an undulating second cavity (66), the first perimeter barrier is an undulating first perimeter barrier (68), and the second perimeter barrier is an undulating second perimeter barrier (70).

Figure 11:
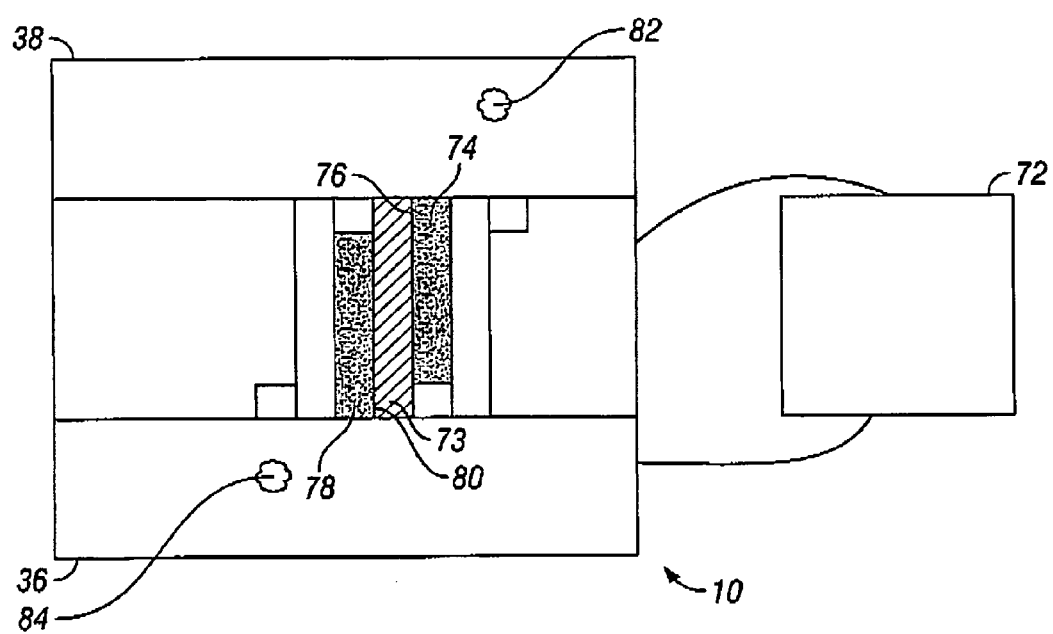
FIG. 11 depicts a cross sectional schematic of an electrical appliance using a fuel cell layer.

FIG. 11 depicts an embodiment wherein the fuel cell is used in conjunction with an electrical appliance (72). The electrical appliance (72) uses the fuel cell layer (10) as a source of power. The unit fuel cells each comprise one or more process layers of electrolyte (73). One or more of the cavities include a first catalyst (74) forming a cathode (76). The other cavities include a second catalyst (78) forming an anode (80). The anode (80) and the cathode (76) are disposed on either side of the electrolyte (73). One or more of the reactant plenums contains an oxidant (82) and the corresponding reactant plenums contain a fuel (84). The anode (80) and the cathode (76) connect to the electrical appliance and provide power.

Examples of electrical appliances usable with the fuel cell layer include airplane electronics, car electronics, laser pointers, cellular phones, wireless phones, projectors, televisions, compact disc players, DVD players, radios, flashlights, and the like.

The embodiments have been described in detail with particular reference to certain preferred embodiments thereof, but it will be understood that variations and modifications can be effected within the scope of the embodiments, especially to those skilled in the art.

What is claimed is:

1. A fuel cell layer with a central axis comprising:
   a. at least a first unit fuel cell and a second unit fuel cell, wherein the first and second unit fuel cells are disposed adjacent each other;
   b. an oxidant plenum comprising an oxidant; and
   c. a fuel plenum comprises a fuel;
   wherein each unit fuel cell comprises:
   i. a first process layer,
   ii. a second process layer,
   iii. a first cavity formed between the first and second process layers;
   iv. a second cavity formed between the second process layer and a first process layer of an adjacent unit fuel cell;
   v. a first perimeter barrier disposed on the second process layer substantially surrounding the second cavity; and
   vi. a second perimeter barrier disposed on the first process layer substantially surrounding the first cavity forming a unit fuel cell comprising a front face and a back face, and wherein the first cavity is in communication with the oxidant plenum and the second cavity is in communication with the fuel plenum, and wherein at least one of the process layers transports ions between the first and second cavities.

2. The fuel cell layer of claim 1, wherein the fuel plenum contains a fuel.

3. The fuel cell layer of claim 2, wherein the fuel comprises: hydrogen, hydrogen from reformate, a methanol, an ethanol, formic acid, ammonia and combinations thereof.

4. The fuel cell layer of claim 1, wherein the oxidant plenum contains an oxidant.

5. The fuel cell layer of claim 4, wherein the oxidant comprises: air, oxygen, mixtures of inert gas and oxygen, and combinations thereof.

6. The fuel cell layer of claim 1, wherein the fuel cell layer is a thin flat construction, wherein the thin flat construction comprises a thickness between 1 nanometer and 2 centimeters.

7. The fuel cell layer of claim 1, wherein the fuel cell layer is a thin curvilinear construction, wherein the thin flat construction comprises a thickness between 1 nanometer and 2 centimeters.

8. The fuel cell layer of claim 1, wherein the unit fuel cells are disposed parallel to each other horizontally around the central axis.

9. The fuel cell layer of claim 1, wherein the unit fuel cells are disposed substantially parallel to each other forming a tube and the unit fuel cells are oriented parallel to the central axis of the tube.

10. The fuel cell layer of claim 1, wherein a first unit fuel cell is disposed at a first angle to an adjacent unit fuel cell and a second unit fuel cell is disposed at a second angle to the first unit fuel cell, and wherein the first angle and the second angle are different.

11. The fuel cell layer of claim 1, wherein a first group of the unit fuel cells is formed into a first group of parallel unit fuel cells, and a second group of unit fuel cells is formed into a second group of parallel unit fuel cells, and the first group of the unit fuel cells is disposed at an arbitrary angle to the second group of unit fuel cells.

12. The fuel cell layer of claim 1, wherein the overall length of the fuel cell layer is between 1 millimeter and 100 centimeters and the overall width of the fuel cell layer is between 1 millimeter and 50 centimeters and the overall thickness between the front face and the back face of the fuel cell layer is between 100 nanometers and 5 centimeters.

13. The fuel cell layer of claim 1, wherein the fuel cell layer comprises a variable thickness.

14. The fuel cell layer of claim 1, wherein the fuel cell layer has a three dimensional shape selected from the group consisting of a cylinder, prismatic, boxlike or irregular shape.

15. The fuel cell layer of claim 1, wherein at least one of the fuel cells are oriented to form the fuel plenum.

16. The fuel cell layer of claim 1, wherein at least one of the first and second unit fuel cells conform to the shape of the fuel plenum.

17. The fuel cell layer of claim 1, wherein the oxidant plenum is enclosed by a structure.

18. The fuel cell layer of claim 17, wherein the structure is open to ambient atmosphere.

19. The fuel cell layer of claim 17, wherein the structure is a closed container.

20. The fuel cell layer of claim 1, wherein the fuel plenum is enclosed by a device.

21. The fuel cell layer of claim 20, wherein the device is open to ambient atmosphere.

22. The fuel cell layer of claim 20, wherein the device is a closed container.

23. The fuel cell layer of claim 1, wherein more than two unit fuel cells are used in the fuel cell layer.

24. The fuel cell layer of claim 1, wherein the fuel cell layer comprises between 2 unit fuel cells and 50,000 unit fuel cells.

25. The fuel cell layer of claim 1, wherein the fuel cell layer comprises between 2 unit fuel cells and 500 unit fuel cells.

26. The fuel cell layer of claim, 1, wherein the fuel cell layer comprises between 2 unit fuel cells and 100 unit fuel cells.

27. The fuel cell layer of claim 1, wherein at least one process layer comprises an ion conducting material.

28. The fuel cell layer of claim 27, wherein the ion conducting material comprises a proton exchange membrane, an electrolyte filled micro-porous structure, a liquid electrolyte trapped in a mesh, and combinations thereof.

29. The fuel cell layer of claim 1, wherein at least one process layer comprises an electronically conductive material.

30. The fuel cell layer of claim 29, wherein the electronically conductive materials comprise a metal, a filled metal composite, a filled micro-structure of polymer, a filled epoxy composite, a graphite composite, or combinations thereof.

31. The fuel cell layer of claim 1, wherein the each perimeter barrier comprises a material that prevents the uncontrolled mixing of fuel and oxidant.

32. The fuel cell layer of claim 31, wherein the material comprises a metal, a silicone, a rubber, a polyamide, a synthetic rubber, an epoxy, polytetrafluoroethylene, polyvinyldiflouride, composites thereof, laminates thereof, alloys thereof, and blends thereof.

33. The fuel cell layer of claim 1, wherein at least one perimeter barrier comprises a form that prevents the uncontrolled mixing of fuel and oxidant.

34. The fuel cell layer of claim 33, wherein the form comprises a micro-structure or a three dimensional structure creating an undulating path.

35. The fuel cell layer of claim 1, wherein the process layers comprise at least one thin sheet, wherein the thin sheet comprises a thickness between 1 nanometer and 2 centimeters.

36. The fuel cell layer of claim 1, wherein at least one process layer comprises a thickness different from another process layer.

37. The fuel cell layer of claim 1, wherein the first process layer is an undulating first process layer, the second process layer is an undulating second process layer, the first cavity is an undulating first cavity, the second cavity is an undulating second cavity, the first perimeter barrier is an undulating first perimeter barrier, and the second perimeter barrier is an undulating second perimeter barrier.

38. The fuel cell layer of claim 1, wherein the adjacent process layers are alternatively ionic conducting process layers and electronic conducting process layers.

39. The fuel cell layer of claim 1, wherein at least one cavity has an aspect ratio greater than 1 cm/cm.

40. The fuel cell layer of claim 1, wherein at least one cavity has an aspect ratio between 1 cm/cm and 100 cm/cm.

41. The fuel cell layer of claim 1, wherein at least one cavity has an aspect ratio between 2.5 cm/cm and 15 cm/cm.

42. The fuel cell layer of claim 1, wherein at least two cavities have different aspect ratios.

43. The fuel cell layer of claim 1, wherein the first and second perimeter barriers each comprise a height ranging from 100 nanometers to 10 millimeters and a width ranging from 10 nanometers to 5 millimeters.

44. The fuel cell layer of claim 1, wherein the first and second perimeter barriers comprise widths which can vary from being narrower on one portion of the perimeter barrier to wider on another portion of the perimeter barrier.

45. An electrical appliance, comprising, as a source of power, the fuel cell layer according to claim 1.

46. The electrical appliance of claim 45, wherein the electrical appliance is an airplane, a car, a laser pointer, a cellular phone, a wireless phone, a projector, a television, a CD player, a radio, or a flashlight.

47. The fuel cell layer of claim 1, wherein a process layer is formed from two or more thin process layers that are placed in contact with each other, wherein the thin process layers comprise a thickness between 1 nanometer and 2 centimeters.

48. A fuel cell layer with a central axis comprising:
   a. at least a first unit fuel cell and a second unit fuel cell, wherein the first and second unit fuel cells are disposed adjacent each other;
   b. an oxidant plenum comprising an oxidant; and
   c. a fuel plenum comprises a fuel;
   wherein each unit fuel cell comprises:
      i. a first process layer
      ii. a second process layer:
      iii. a first cavity formed between the first and second process layers;
      iv. a second cavity formed between the second process layer and a first process layer of an adjacent unit fuel cell;
      v. a first perimeter barrier disposed on the second process layer substantially surrounding the second cavity; and
      vi. a second perimeter barrier disposed on the first process layer substantially surrounding the first cavity forming a unit fuel cell comprising a front face and a back face, and wherein the first cavity is in communication with the oxidant plenum and the second cavity is in communication with the fuel plenum, and wherein at least one of the process layers transports ions between the first and second cavities wherein at least the first cavity or the second cavity is at least partially filled with a catalyst.

49. A fuel cell layer, with a central axis comprising:
   a. at least a first unit fuel cell and a second unit fuel cell, wherein the first and second unit fuel cells are disposed adjacent each other;
   b. an oxidant plenum comprising an oxidant; and
   c. a fuel plenum comprises a fuel;
   wherein each unit fuel cell comprises:
      i. a first process layer;
      ii. a second process layer;
      iii. a first cavity formed between the first and second process layers;
      iv. a second cavity formed between the second process layer and a first process layer of an adjacent unit fuel cell;
      v. a first perimeter barrier disposed on the second process layer substantially surrounding the second cavity; and
      vi. a second perimeter barrier disposed on the first process layer substantially surrounding the first cavity forming a unit fuel cell comprising a front face and a back face, and wherein the first cavity is in communication with the oxidant plenum and the second cavity is in communication with the fuel plenum, and wherein at least one of the process layers transports ions between the first and second cavities, and wherein at least one cavity is at least partially filled with at least one gas diffusion electrode containing at least one catalyst layer and at least one porous conductive layer.

50. The fuel cell of claim 49, wherein the gas diffusion electrode comprises at least one porous layer and at least one catalyst layer, wherein the catalyst layer adjoins the ionic conducting process layer forming an anode or a cathode, and wherein the porous conductive layer electrically connects the catalyst layer to an electronically conducting process layer enabling current to flow between gas diffusion electrodes creating a bipolar connected fuel cell layer.

51. The fuel cell layer of claim 49, wherein the porous conductive layer comprises a polymer bound carbon composite, a micro-structured carbon monolith, a porous conductive media, a porous metal foam, conductive microstructure, or combinations thereof.

52. The fuel cell layer of 49, wherein the porous conductive layer comprises at least two layers of differing porous materials.

53. The fuel cell layer of claim 49, wherein the process layers are each ionically conductive.

54. The fuel cell layer of claim 49, wherein the gas diffusion electrode comprises a first and second catalyst layer; wherein the first catalyst layer adjoins the first process layer and the second catalyst layer adjoins the second process layer forming an edge collected uni-polar fuel cell layer with two identical polarity electrodes in the gas diffusion electrode such that current flowing into or out of the identical polarity electrode passes through at least one porous conductive layer creating an edge collected uni-polar fuel cell layer.

55. The fuel cell layer of claim 49, wherein the catalyst layers comprise: a noble metal catalyst, a transition metal catalyst, alloys thereof, and combinations thereof.

56. The fuel cell layer of claim 49, wherein the catalyst layers comprise: a carbon supported catalyst, or, a thin film formed by spraying, sputtering, electroplating, printing, pulsed laser deposition, and combinations thereof.

57. The fuel cell layer of claim 49, wherein one of the catalyst layers is cracked.

58. The fuel cell layer of claim 49, wherein the transport of fuel or oxidant from one of the plenums to at least one catalyst layer is by diffusion.

59. The fuel cell layer of claim 49, wherein the transport of fuel or oxidant from one of the plenums to at least one catalyst layer is by forced convection.

* * * * *

UNITED STATES PATENT AND TRADEMARK OFFICE
CERTIFICATE OF CORRECTION

PATENT NO. : 7,067,217 B2
APPLICATION NO. : 10/818611
DATED : June 27, 2006
INVENTOR(S) : Gerard Francis McLean, Duhane Lam and Olen Richard Vanderleeden It is certified that error appears in the above-identified patent and that said Letters Patent is hereby corrected as shown below:

On Title Page
Item 57 Abstract; change "fuel plenum comprises" to --fuel plenum comprising--

Item 57 Abstract; change "fuel cell comprises" to --fuel cell comprising--

Item 57 Abstract; remove "and second cavity" after "a first cavity"

Item 57 Abstract; change "second process layer" to --second process layers--

Item 57 Abstract; insert --second cavity formed between the second process layer and the-- between "a" and "first process layer of"

Column 1, Line 16, change "a gas diffusion layer" to --gas diffusion layers--

Column 1, Line 16, change "catalyst layer." to -- catalyst layers and an electrolyte layer.--

Column 1, Line 30, change "to maintain" to --with maintaining--

Column 1, Line 30, insert --and with-- between "contact" and "both"

Column 1, Line 43, change "to prevent" to --while preventing--

Column 1, Line 66, change "typical layering approach of" to --typical approach of layering--

Column 2, Line 6, change "because of having" to --with--

Column 2, Line 38, change "front and back process layer" to --first and second process layer--

Column 2, Line 39, change "front and back cavity" to --first and second cavity--

Column 2, Line 39, change "front and back perimeter barrier" to --second and first perimeter barrier--

Column 2, Line 40, change "front cavity" to --first cavity--

UNITED STATES PATENT AND TRADEMARK OFFICE
CERTIFICATE OF CORRECTION

PATENT NO. : 7,067,217 B2
APPLICATION NO. : 10/818611
DATED : June 27, 2006
INVENTOR(S) : Gerard Francis McLean, Duhane Lam and Olen Richard Vanderleeden It is certified that error appears in the above-identified patent and that said Letters Patent is hereby corrected as shown below:

Column 2, Line 42, change "back cavity" to --second cavity--

Column 3, Line 11, change "an electrical appliance using a fuel cell layer." to --a unit fuel cell within a fuel cell layer that is being used as a power source for an electrical appliance.--

Figure 3:
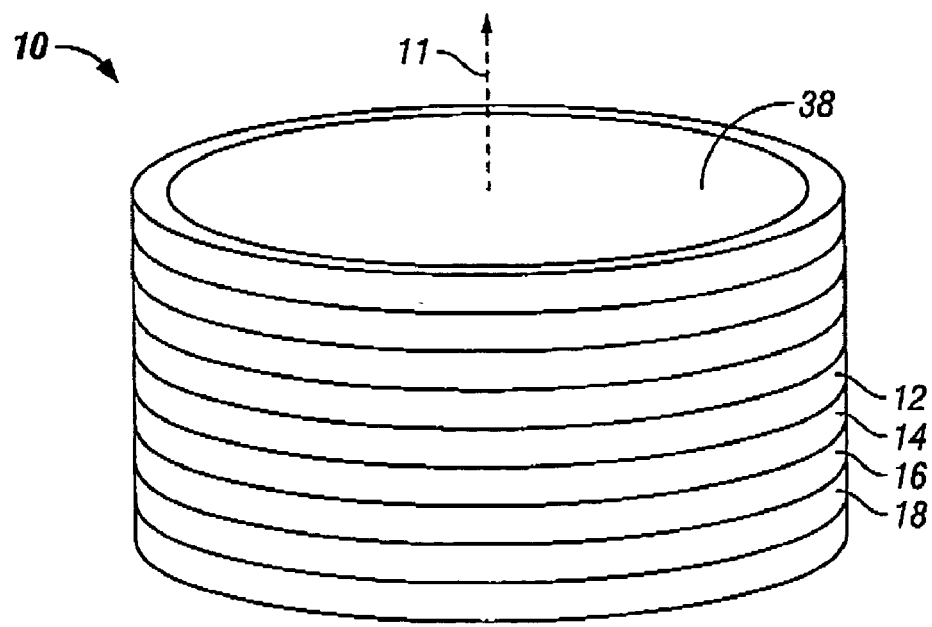
FIG. 3 depicts front perspective view of a fuel cell layer, wherein the unit fuel cells enclosing the fuel plenum are horizontally oriented.

Column 3, Line 61, change "FIG 2" to --FIG 3--

Column 3, Line 62, change "10 unit fuel cells" to --9 unit fuel cells--

Column 3, Line 62, insert --layer-- between "cell" and "depicted"

Column 3, Line 62, change "FIG 2" to --FIG 3--

Column 4, Line 4, remove "more" between "be" and "narrow"

Column 4, Line 5, change "larger" to --wider--

Column 4, Line 14, remove "be" between "with" and "the"

Column 4, Line 15, insert --the-- between "with" and "fuel"

Column 4, Line 19, change "and" to --or--

Column 4, Line 21, insert --can be-- between "or" and "open"

Column 4, Line 23, remove "the" between "to" and "ambient"

Column 4, Line 30, change "and" to --or--

Column 4, Line 31, insert --can be-- between "or" and "open"

Column 5, Line 6, change "Optionally, at" to --At--

Column 5, Line 11, change "and" to --or--

Column 5, Line 24, change "and" to --or--

Column 5, Line 28, change "is a thin film" to --are thin films--

UNITED STATES PATENT AND TRADEMARK OFFICE
CERTIFICATE OF CORRECTION

| | |
|---|---|
| PATENT NO. | : 7,067,217 B2 |
| APPLICATION NO. | : 10/818611 |
| DATED | : June 27, 2006 |
| INVENTOR(S) | : Gerard Francis McLean, Duhane Lam and Olen Richard Vanderleeden |

It is certified that error appears in the above-identified patent and that said Letters Patent is hereby corrected as shown below:

Column 5, Line 51, change "front perimeter barrier" to --first perimeter barrier--

Column 5, Line 51, change "back perimeter barrier" to --second perimeter barrier--

Column 5, Line 52, change "front perimeter barrier" to --first perimeter barrier--

Column 5, Line 52, change "first process layer" to --second process layer--

Column 5, Line 54, change "front perimeter barrier" to --first perimeter barrier--

Column 5, Line 56, change "back perimeter barrier" to --second perimeter barrier--

Column 5, Line 57, change "second process layer" to --first process layer--

Column 5, Line 58, change "back perimeter barrier" to --second perimeter barrier--

Column 5, Line 64, change "fuel and oxidant" to --oxidant and fuel--

Column 5, Line 65, change "fuel oxidation and oxidant reduction" to --oxidant reduction and fuel oxidation--

Column 6, Line 31, insert --high-- between "the" and "aspect ratio"

Column 6, Line 46, insert --,-- between "Edegem" and "Belgium"

Column 7, Line 19, change "layers" to --layer--

Column 7, Line 32, change "and" to --or--

Column 7, Line 54, change "by corresponding first and second process layers" to --between the second process layer and the first process layer of an adjacent unit fuel cell.--

Column 7, Line 63, change "60 and 62" to --62 and 60--

Column 7, Line 64, change "64" to --66--

Column 7, Line 65, change "66" to --64--

UNITED STATES PATENT AND TRADEMARK OFFICE
CERTIFICATE OF CORRECTION

PATENT NO. : 7,067,217 B2
APPLICATION NO. : 10/818611
DATED : June 27, 2006
INVENTOR(S) : Gerard Francis McLean, Duhane Lam and Olen Richard Vanderleeden It is certified that error appears in the above-identified patent and that said Letters Patent is hereby corrected as shown below:

Column 7, Line 66, change "68" to --70--

Column 8, Line 1, change "70" to --68--

Column 8, Line 40, change "comprises" to --comprising--

Column 8, Line 64, change "a methanol, an ethanol" to --methanol, ethanol--

Column 9, Line 40, change "prism, boxlike or irregular shape" to --a prism, a boxlike shape and an irregular shape--

Column 9, Line 43, change "are" to --is--

Signed and Sealed this

Third Day of June, 2008

JON W. DUDAS
*Director of the United States Patent and Trademark Office*